(12) United States Patent
Zlotnick

(10) Patent No.: US 12,248,863 B2
(45) Date of Patent: Mar. 11, 2025

(54) IDENTIFYING A FINDING IN A DATASET USING A MACHINE LEARNING MODEL ENSEMBLE

(71) Applicant: International Business Machines Corporation, Armonk, NY (US)

(72) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 17/167,113

(22) Filed: Feb. 4, 2021

(65) Prior Publication Data
US 2022/0245427 A1 Aug. 4, 2022

(51) Int. Cl.
*G06N 3/045* (2023.01)
*G06N 3/02* (2006.01)
*G06N 3/08* (2023.01)
*G06N 20/00* (2019.01)
*G06N 20/20* (2019.01)

(52) U.S. Cl.
CPC ............... *G06N 3/045* (2023.01); *G06N 3/02* (2013.01); *G06N 3/08* (2013.01); *G06N 20/00* (2019.01); *G06N 20/20* (2019.01)

(58) Field of Classification Search
None
See application file for complete search history.

(56) References Cited

U.S. PATENT DOCUMENTS

2010/0098306 A1  4/2010  Madabhushi

FOREIGN PATENT DOCUMENTS

KR    10-2108050 B1    5/2020

OTHER PUBLICATIONS

Krawczyk, Bartosz, and Gerald Schaefer. "An improved ensemble approach for imbalanced classification problems." In 2013 IEEE 8th international symposium on applied computational intelligence and informatics (SACI), pp. 423-426. IEEE, 2013. (Year: 2013).*
Jabbar, Meerja Akhil. "Breast cancer data classification using ensemble machine learning." Engineering & Applied Science Research 48, No. 1. Published Jan. 27, 2021. (Year: 2021).*

(Continued)

*Primary Examiner* — Vincent Gonzales
(74) *Attorney, Agent, or Firm* — Kristofer Haggerty

(57) ABSTRACT

There is provided a computer-implemented method of identifying a finding in an input sub-dataset of an input dataset using an ensemble of machine learning (ML) models, comprising: obtaining outcomes of an ensemble of ML models generated in response to feeding each input sub-dataset of the input dataset into each ML model of the ensemble trained to generate an outcome indicative of likelihood of a finding depicted in a respective input sub-dataset, creating a two dimensional (2D) outcome dataset storing outcomes of the ensemble, wherein a first dimension denotes the respective ML model and a second dimension denotes the respective input sub-dataset, computing a filtered 2D dataset by applying a filter function to the 2D outcome dataset, and analyzing the filtered 2D dataset to identify specific input sub-dataset(s) likely depicting the finding.

19 Claims, 6 Drawing Sheets

(56) References Cited

OTHER PUBLICATIONS

Kim, Seong Tae, Dae Hoe Kim, and Yong Man Ro. "Breast mass detection using slice conspicuity in 3D reconstructed digital breast volumes." Physics in Medicine & Biology 59, No. 17 (2014): 5003.) (Year: 2014).*

Ameta, "Ensemble Classifier Approach In Breast Cancer Detection And Malignancy Grading—A Review", International Journal of Managing Public Sector Information and Communication Technologies (IJMPICT), 8(1), 17-26, Mar. 2017.

Anonymous, "Digital breast tomosynthesis volumes classification using reduction to slices analysis via deep learning with fine tuning from digital mammography and estimated online hard negative slices mining", retrieved from Internet on Dec. 7, 2020, 4 pages.

Assiri et al., "A Hybrid Ensemble Method for Accurate Breast Cancer Tumor Classification Using State-of-the-Art Classification Learning Algorithms", Computer Science, 2019, 11 pages.

Cheema et al., "Malignant Breast Cancer Detection Method—A Review", International Journal of Engineering Research & Technology (IJERT), 2(4): 1226-1230, Apr. 2013.

Liang et al., "Joint 2D-3D Breast Cancer Classification", IEEE International Conference on Bioinformatics and Biomedicine (BIBM), 692-696, 2019.

* cited by examiner

IDENTIFYING A FINDING IN A DATASET USING A MACHINE LEARNING MODEL ENSEMBLE

BACKGROUND

The present invention, in some embodiments thereof, relates to ML models for analysis of datasets and, more specifically, but not exclusively, to systems and methods for analyzing outcomes of an ensemble of machine learning (ML) models analyzing a dataset.

Ensembles of ML models are used to analyze datasets, since the result of the ensemble of the ML model may be more accurate over the result of a single ML model. For example, an ensemble of ML models may improve ability to detect a finding in a large dataset over a single ML model analyzing the dataset.

SUMMARY

According to a first aspect, a computer implemented method of identifying a finding in an input sub-dataset of an input dataset using an ensemble of machine learning (ML) models, comprises: obtaining outcomes of an ensemble of a plurality of ML models generated in response to feeding each of a plurality of input sub-datasets of the input dataset into each ML model of the ensemble of the plurality of ML models trained to generate an outcome indicative of likelihood of a finding depicted in a respective input sub-dataset, creating a two dimensional (2D) outcome dataset storing outcomes of the ensemble of the plurality of ML models, wherein a first dimension denotes the respective ML model of the ensemble of ML models and a second dimension denotes the respective input sub-dataset of the plurality of input sub-datasets of the input dataset, computing a filtered 2D dataset by applying a filter function to the 2D outcome dataset, and analyzing the filtered 2D dataset to identify at least one specific input sub-dataset of the plurality of input sub-datasets of the input dataset likely depicting the finding.

According to a second aspect, a device for identifying a finding in an input sub-dataset of an input dataset using an ensemble of machine learning (ML) models, comprises: at least one processor executing a code for: obtaining outcomes of an ensemble of a plurality of ML models generated in response feeding each of a plurality of input sub-datasets of the input dataset into each ML model of the ensemble of the plurality of ML models trained to generate an outcome indicative of likelihood of a finding depicted in a respective input sub-dataset, creating a two dimensional (2D) outcome dataset storing outcomes of the ensemble of the plurality of ML models, wherein a first dimension denotes the respective ML model of the ensemble of ML models and a second dimension denotes the respective input sub-dataset of the plurality of input sub-datasets of the input dataset, computing a filtered 2D dataset by applying a filter function to the 2D outcome dataset, and analyzing the filtered 2D dataset to identify at least one specific input sub-dataset of the plurality of input sub-datasets of the input dataset likely depicting the finding.

According to a third aspect, a computer program product for identifying a finding in an input sub-dataset of an input dataset using an ensemble of machine learning (ML) models, comprising a non-transitory medium storing a computer program which, when executed by at least one hardware processor, cause the at least one hardware processor to perform: obtaining outcomes of an ensemble of a plurality of ML models generated in response feeding each of a plurality of input sub-datasets of the input dataset into each ML model of the ensemble of the plurality of ML models trained to generate an outcome indicative of likelihood of a finding depicted in a respective input sub-dataset, creating a two dimensional (2D) outcome dataset storing outcomes of the ensemble of the plurality of ML models, wherein a first dimension denotes the respective ML model of the ensemble of ML models and a second dimension denotes the respective input sub-dataset of the plurality of input sub-datasets of the input dataset, computing a filtered 2D dataset by applying a filter function to the 2D outcome dataset, and analyzing the filtered 2D dataset to identify at least one specific input sub-dataset of the plurality of input sub-datasets of the input dataset likely depicting the finding.

In a further implementation form of the first, second, and third aspects, computing the filtered 2D dataset by applying the filter function and analyzing the filtered 2D dataset comprises: inputting the 2D outcome dataset into a finding-convolutional neural network (CNN) trained on a training dataset of a plurality of sample 2D outcome datasets computed from outcomes of the ensemble of the plurality of ML models in response to inputs of a plurality of sample input sub-datasets of a plurality of sample input datasets, each of the plurality of sample 2D outcome datasets labelled with a first ground truth class indicative of at least one sample input sub-dataset depicting the finding or with a second ground truth class indicative of absence of the finding in the sample input 2D dataset, and obtaining as an outcome of the finding-CNN, the at least one specific sub-dataset of the plurality of input sub-datasets of the input dataset likely depicting the finding.

In a further implementation form of the first, second, and third aspects, the finding-CNN is trained using a loss function that maximizes a distance between the first ground truth class indicative of presence of the finding and the second ground truth class indicative of absence of the finding.

In a further implementation form of the first, second, and third aspects, the loss function is selected from a group consisting of: (i) a difference between mean scores of the sample 2D outcome dataset columns of the first and second ground truth classes, (ii) a ratio between the mean scores of the sample 2D outcome dataset columns of the first and second ground truth classes, (iii) an average of a difference between average positive scores of the sample 2D outcome dataset columns of the first ground truth class and average negative scores of the sample 2D outcome dataset columns of the second ground truth class, per ML model of the ensemble of the plurality of ML models, and (iv) an average of a ratio between average positive scores of the sample 2D outcome dataset columns of the first ground truth class and average negative scores of the sample 2D outcome dataset columns of the second ground truth class, per ML model of the ensemble of the plurality of ML models, wherein each respective column indicates a set of values outputted by the ML ensemble for a specific input sub-dataset.

In a further implementation form of the first, second, and third aspects, the finding-CNN is arranged in a dual head architecture, wherein the sample 2D outcome datasets are fed into an input of the finding-CNN, and both of (i) the labels of the sample 2D outcome dataset columns and (ii) the column of the 2D outcome dataset corresponding to the labelled sample 2D input dataset column, serve as ground truth targets that influence the learning of the weights of the finding-CNN, wherein a loss function of a first head minimizes a difference between mean scores of the sample 2D outcome dataset columns, and a second head produces a classification of the sample 2D outcome dataset, wherein a loss function of the second head is based on an error of the classification.

In a further implementation form of the first, second, and third aspects, further comprising computing a filtered 2D dataset by computing a convolution between a 2D kernel filter and the 2D outcome dataset, wherein the filtered 2D dataset is inputted into the CNN, and wherein the training dataset includes a plurality of sample filtered 2D datasets created by computing the convolution between the 2D kernel filter and each of plurality of sample 2D outcome datasets.

In a further implementation form of the first, second, and third aspects, computing the filtered 2D dataset comprises inputting the 2D outcome dataset into a filter-CNN, and obtaining the filtered 2D dataset as an outcome of the filter-CNN, wherein the filter-CNN is training on a training dataset of a plurality of sample records, each including a respective sample 2D outcome dataset and a ground truth label of a respective sample filtered 2D dataset.

In a further implementation form of the first, second, and third aspects, the 2D outcome dataset is represented as a 2D image, wherein pixel intensity values of the 2D image denote respective outcomes of the ensemble of the plurality of ML models, wherein the filter function is an image processing filter.

In a further implementation form of the first, second, and third aspects, ML models of the ensemble of the plurality of ML models are clustered into a plurality of clusters, each cluster including ML models of a same architecture, wherein clusters of architecture that have increasing statistical distance between the different architectures are arranged consecutively along the first dimension of the 2D outcome dataset, and within each cluster, ML models of the respective cluster that have increasing statistical distances between meta-parameters of the same architecture are arranged consecutively.

In a further implementation form of the first, second, and third aspects, ML models of the ensemble of the plurality of ML models are arranged consecutively along the first dimension of the 2D outcome dataset according to similarity in performance, wherein ML models that are closer in similarity of performance are closer along the first dimension and ML models that are further in similarity of performance are further away along the first dimension.

In a further implementation form of the first, second, and third aspects, wherein computing a filtered 2D dataset by applying a filter function to the 2D outcome dataset comprises computing a filtered 2D dataset by computing a convolution between a 2D kernel filter and the 2D outcome dataset, and wherein analyzing comprises analyzing the filtered 2D dataset.

In a further implementation form of the first, second, and third aspects, the 2D outcome dataset and the 2D kernel filter are arranged as respective matrices.

In a further implementation form of the first, second, and third aspects, further comprising: feeding the 2D outcome dataset into a kernel-CNN trained on a training dataset of a plurality of sample 2D outcome datasets each labelled with a ground truth label indicative of a finding, for generating an outcome of a convolutional kernel, wherein the kernel-CNN is trained using a loss function where a maximal mean of a column of an input of a 2D outcome dataset that when filtered by the outcome of the convolutional kernel of the kernel-CNN, is closest to the ground truth label, and obtaining the 2D kernel filter as the outcome convolutional kernel of the kernel-CNN.

In a further implementation form of the first, second, and third aspects, the kernel filter is selected from a group consisting of: a median filter, an edge detection filter, a sharpen filter, a box blur filter, a Gaussian blur filter, an unsharp masking filter.

In a further implementation form of the first, second, and third aspects, analyzing the filtered 2D dataset is selected from a group consisting of: (i) computing a respective sum, for each respective 2D input sub-dataset, from the outcomes of the ensemble of the plurality of ML models in response to an input of the respective input sub-dataset, and selecting the at least one specific input sub-dataset according to a specific sum denoting a maximal of the respective sums (ii) identifying for each input sub-dataset, a maximal value of the outcome of the ensemble of the plurality of ML models, selecting the at least one specific input sub-dataset according to the maximal value of the plurality of input sub-datasets, wherein the maximal value of the outcome of the at least one specific input sub-dataset denotes the likelihood of the finding depicted in the at least one specific input sub-dataset.

In a further implementation form of the first, second, and third aspects, further comprising, prior to analyzing the filtered 2D dataset: computing for each input sub-dataset dimension of the filtered 2D dataset, an average of the outcomes of the ensemble of ML models, and for each input sub-dataset dimension of the filtered 2D dataset, subtracting the average from the respective outcome.

In a further implementation form of the first, second, and third aspects, the input dataset comprises 3D medical images, and the plurality of sub-datasets comprise a plurality of 2D medical images created by dividing the 3D medical image and/or captured as a video.

In a further implementation form of the first, second, and third aspects, the 3D medical image is selected from the group consisting of: CT, MRI, breast tomography, digital breast tomosynthesis (DBT), 3D ultrasound, 3D nuclear imaging, and PET, or wherein the plurality of 2D medical images are captured as a video by a 2D imaging device selected from the group consisting of: colonoscope, endoscope, bronchoscope, and 2D ultrasound.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION

Figure 1:
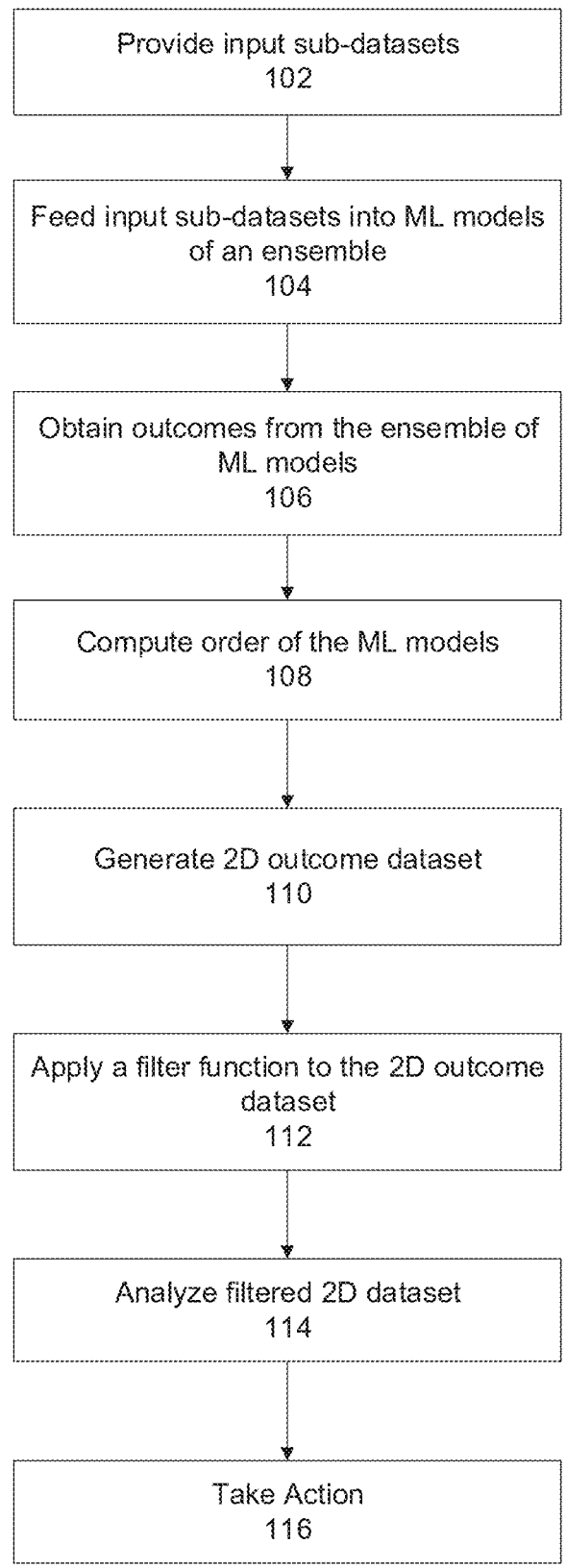
FIG. 1 is a flowchart of a method of identifying a finding in an input sub-dataset of an input dataset using an ensemble of ML models, in accordance with some embodiments of the present invention.

The present invention, in some embodiments thereof, relates to ML models for analysis of datasets and, more specifically, but not exclusively, to systems and methods for analyzing outcomes of an ensemble of machine learning (ML) models analyzing a dataset.

An aspect of some embodiments of the present invention relates to systems, methods, a device, and/or code instructions (stored on a memory and executable by a processor) for identifying a finding in an input sub-dataset of an input dataset using an ensemble of machine learning (ML) models. For example, identifying a 2D slice of a 3D mammographic image as likely depicting cancer, and/or identifying a time interval from a 24 hour electrocardiogram (ECG) recording as likely depicting an arrhythmia. Outcomes of an ensemble of ML models are obtained. The outcomes may be scores indicative of likelihood of the finding being depicted in an input sub-dataset. The outcomes are generated in response to feeding each of multiple input sub-datasets of an input dataset into each ML model of the ensemble of the .ML models. The ensemble of ML models is trained to generate an outcome (e.g., score, probability value) indicative of likelihood of a finding depicted in a respective input sub-dataset. A two dimensional (2D) outcome dataset is created by arranging the outcomes of the ensemble of ML models. The 2D outcome dataset includes a first dimension denoting the respective ML model and a second dimension denoting the respective input sub-dataset. The 2D outcome dataset may be represented as an image and/or stored using an image storage format, where each pixel intensity value corresponds to the value of the outcome generated by a respective ML model for the respective input sub-dataset. A filtered 2D dataset is computed by applying a filter function to the 2D outcome dataset. The filter function may be, for example, an image processing filter designed to process images such as a 2D kernel filter, outputted by a trained kernel-CNN, a trained filter-CNN, and/or a trained finding-CNN. The filtered 2D dataset is analyzed to identify at least one specific input sub-dataset likely depicting the finding. The analysis may be performed by the finding-CNN (e.g., as an outcome of the finding-CNN), and/or scores of the filtered 2D dataset may be analyzed (e.g., highest aggregated value for the specific input sub-dataset). The specific input sub-dataset may be outputted, for example, presented on a display (e.g., the 2D slice of the 3D mammographic image, and/or portion of ECG recording).

Inventors made the surprising discovery that applying the filter function to the 2D outcome dataset increases the accuracy of the identified specific input sub-dataset and/or reduces false positively identified specific input sub-datasets, in comparison to using standard approaches to analyzing outcomes of an ensemble of ML models without applying the filter function and/or without arranging the outcomes into a 2D outcome dataset.

At least some implementations of the systems, methods, apparatus, and/or code instructions described herein relate to the technical problem of and/or improve the technology of a computing device computing an outcome of an ML model ensemble indicating presence of a finding in an input dataset, by improving the ability of the computing device to more accurately detect the finding. The finding is identified within one or more input sub-datasets of an input dataset, by reducing the number of identified input sub-dataset (reduction in false positives) and/or increasing the accuracy of the identification. When the number of ML models in the ensemble and/or the number of input sub-datasets is large, the total number of outcomes to evaluate may be large (i.e., the number of ML models multiplied by the number of input sub-datasets). A higher accuracy greatly reduces the effort (e g, manual human review effort and/or computational resources of a computer) of evaluating the identified input sub-datasets for the presence of the finding. For example, a computing device computing a finding (e.g., cancer) in a 3D medical image (e.g., captured by CT, MRI, PET, and a 3D mammogram) and/or in a sequence of 2D medical images (e.g., captured as a video of 2D imaging data by a 2D sensor, for example, captured by a colonoscope, endoscope, bronchoscope, and/or 2D ultrasound). In another example, computing device computing a finding of an arrhythmia in ECG signals sensed by ECG electrodes, such as a 24 hour ECG signal obtained from a Holter monitor. In yet another example, computing device computing a finding indicating when a bridge is at risk based on a stress sensor sensing the bridge.

Although existing approaches using ML model ensembles improve the outcome indicating whether the input dataset depicts the finding over using a single ML model, many sub-datasets of the input dataset may be incorrectly identified as likely depicting the finding. This is due to the outcome of each ML model of the ensemble being noisy and/or the large number of sub-dataset that are analyzed by the ML model ensemble. For example, in digital breast tomosynthesis (DBT), the 3D image may be represented as 60-100 slices of 2000×3000 pixels, with a typical study including four 3D images (e.g., 2 views for each left and right breast). As such, different ML models may identify different sub-datasets as likely depicting findings. The resulting identified sub-datasets include all of the sub-datasets identified by all of the ML models of the ensemble, which may be a large number (e.g., dozens of slices). In the case of analyzing medical images, the radiologist may then need to manually review each of the identified 2D slices to determine which slices represent real visual findings, and which slices are false alarms. At least some implementations of the systems, methods, apparatus, and/or code instructions described herein increase accuracy of the computer analyzing outcomes of the ML models, which result in fewer identified sub-datasets, reducing the false alarms. For the case of medical images, fewer identified 2D slices, which means that the radiologist has fewer slices to manually review.

At least some implementations of the systems, methods, apparatus, and/or code instructions described herein provide a solution to the above mentioned technical problem and/or improve a computing device identifying a specific input sub-dataset of an input dataset by analyzing outcome of the ML model ensemble, by creating a 2D outcome dataset that includes the outcomes of the ensemble of the ML models, applying a filter function to the 2D outcome dataset, and analyzing the filtered 2D dataset to identify the specific input sub-dataset likely depicting the finding. A first dimension of the 2D outcome dataset denotes the respective ML model and a second dimension of the 2D outcome dataset denotes the respective input sub-dataset of the input dataset. The filter function may be, for example, a trained finding-CNN that receives the 2D outcome dataset and generates an outcome indicating the specific input sub-dataset, a trained filter-CNN that is fed the 2D outcome dataset and generates an outcome of the filtered 2D dataset, an outcome of a trained kernel-CNN that is fed the 2D outcome dataset, and/or a 2D kernel filter such as an image processing filter that may be applied by a convolution operation. Inventors discovered that certain imaging processing filters may improve results, for example, using a median filter as described in the Examples section. Inventors discovered that certain ordering of the first dimension of the 2D outcome dataset may improve results, for example, ordering by performance of the ML models, as described herein.

At least some implementations of the systems, methods, apparatus, and/or code instructions described herein may be used with existing ML model ensembles, without necessarily requiring re-training of the ML model ensemble and/or adaptation of the ML model ensemble. For example, an add-on code, such as a library function, may receive the outcomes from the existing ML model ensembles and determine the specific input sub-dataset(s).

The approaches of at least some implementations of the methods, systems, apparatus, and/or code instructions described herein are different than other standard approaches for analyzing outcomes of an ML model ensemble to identify sub-dataset (s) likely depicting the finding, and/or to identify the finding for the input dataset as a whole. In standard approaches, the outcomes of the ML model ensemble in response to an input of each sub-dataset are used in their raw form. No additional adjustment and/or processing of the outcomes of the ML model ensemble is done. In particular, the outcomes are not formatted into a 2D outcome dataset, and no filter function is applied to the 2D outcome dataset. In contrast, at least some implementations of the methods, systems, apparatus, and/or code instructions described herein format the outcomes of the ML models of the ensemble into a 2D outcome dataset, and apply a filter function to the 2D outcome dataset. The filtered 2D dataset is analyzed rather than the raw outcomes to identify the sub-datasets likely depicting findings.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
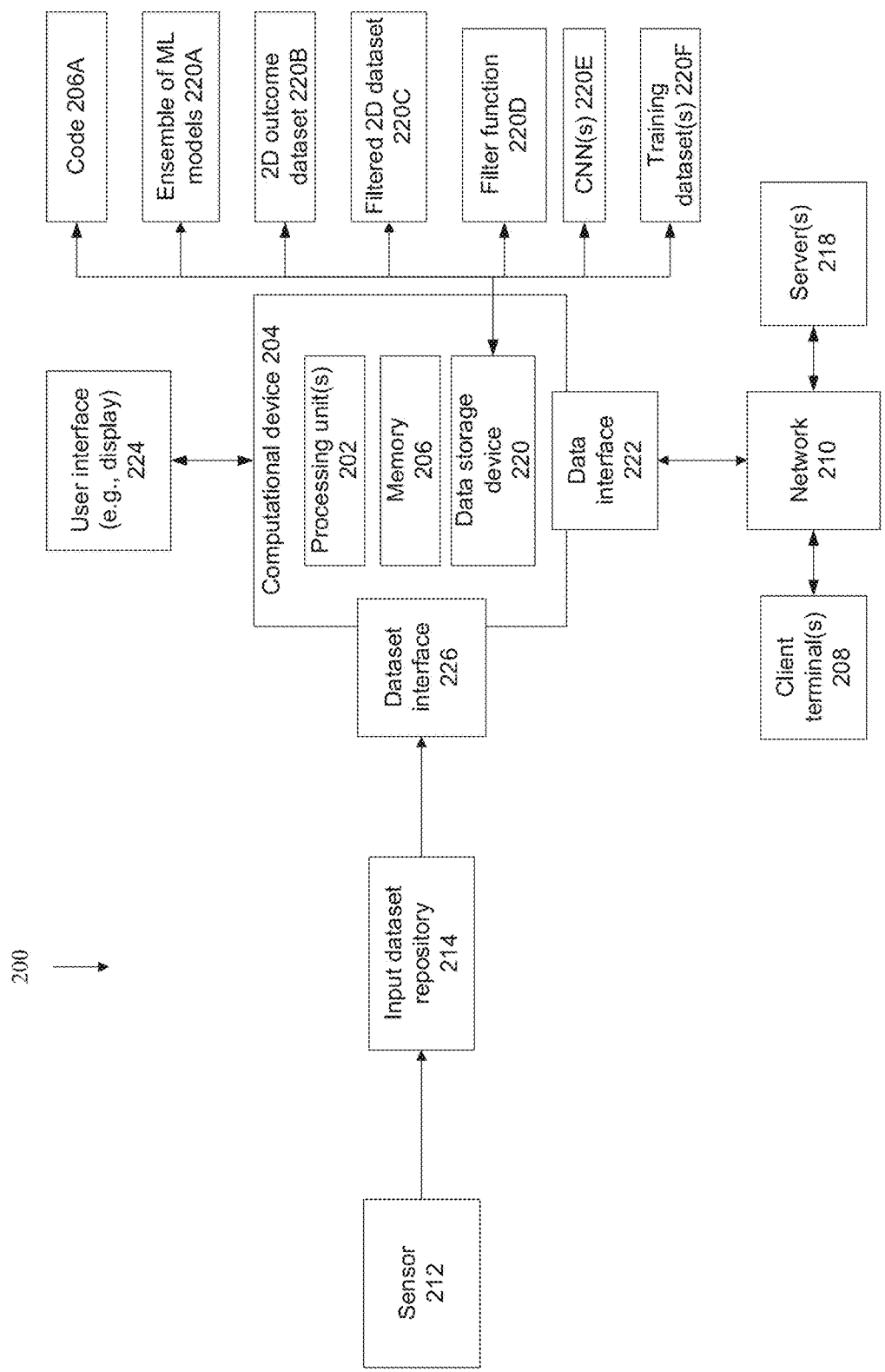
FIG. 2 is a block diagram of components of a system for identifying a finding in an input sub-dataset of an input dataset using an ensemble of ML models and/or for training one or more CNNs related to the filter function, in accordance with some embodiments of the present invention.
Figure 3:
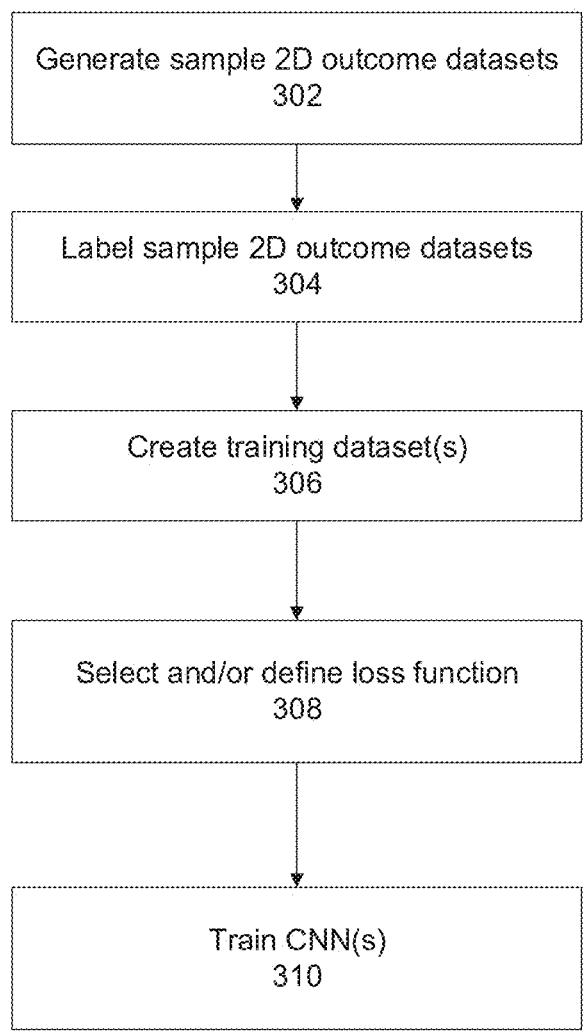
FIG. 3 is a flowchart of a method for training one or more CNNs relate to the filter function for identifying a finding in an input sub-dataset of an input dataset using an ensemble of ML models, in accordance with some embodiments of the present invention.

Reference is now made to FIG. 1, which is a flowchart of a method of identifying a finding in an input sub-dataset of an input dataset using an ensemble of ML models, in accordance with some embodiments of the present invention. Reference is also made to FIG. 2, which is a block diagram of components of a system 200 for identifying a finding in an input sub-dataset of an input dataset using an ensemble of ML models and/or for training one or more CNNs 220E (e.g., filter-CNN, finding-CNN, kernel-CNN) related to a filter function 220D, in accordance with some embodiments of the present invention. Reference is also made to FIG. 3, which is a flowchart of a method for training one or more CNNs (e.g., filter-CNN, finding-CNN, kernel-CNN) related to the filter function for identifying a finding in an input sub-dataset of an input dataset using an ensemble of ML models, in accordance with some embodiments of the present invention. System 200 may implement the features of the method described with reference to FIG. 1 and/or FIG. 3, by one or more hardware processors 202 of a computing device 204 executing code instructions stored in a memory (also referred to as a program store) 206.

Computing device 204 may be implemented as, for example, a client terminal, a server, a radiology workstation, a virtual machine, a virtual server, a computing cloud, a mobile device, a desktop computer, a thin client, a Smartphone, a Tablet computer, a laptop computer, a wearable computer, glasses computer, and a watch computer.

Computing 204 may include an advanced visualization workstation that sometimes is add-on to a radiology workstation and/or other devices.

Computing device 204 and/or client terminals 208 and/or servers 218 may be implemented as, for example, radiology workstations, image viewing stations, picture archiving and communication system (PACS) server, and electronic medical record (EMR) server.

Multiple architectures of system 200 based on computing device 204 may be implemented. In an exemplary implementation, computing device 204 storing code 206A may be implemented as one or more servers (e.g., network server, web server, a computing cloud, a virtual server) that provides services (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development king (SDK)), providing an application for local download to the servers 218 and/or client terminal(s) 208, and/or providing functions using a remote access session to the servers 218 and/or client terminal(s) 208, such as through a web browser and/or viewing application. For example, users use client terminals 208 to access computing device 204 acting as a PACS server or other medical image storage server. Computing device 204 may compute the filtered 2D dataset used for identifying one or more specific input sub-datasets depicting presence of a finding, where the input dataset (and/or input sub-dataset) may be obtained from sensor(s) 212 and/or provided by the client terminal 208 and/or obtained from another data source (e.g., a data server 218). The identified specific input sub-dataset may be provided to the client terminal 208 for presentation on a display of client terminal 208 and/or provided for further processing and/or stored. Alternatively, the filtered 2D dataset is provided to client terminal 208 and/or to server 218, and the analysis of the filtered 2D dataset to identify the specific input sub-dataset depicting the visual findings may be locally performed by client terminal 208 and/or serve 218. Training of one or more CNNs 220E (e.g., filter-CNN, finding-CNN, kernel-CNN) related to a filter function 220D may be performed centrally by computing device 204 and/or locally at client terminal 208 and/or by another device (e.g., server 218). In another implementation, computing device 204 may include locally stored software (e.g., code 206A) that performs one or more of the acts described with reference to FIG. 1 and/or FIG. 3, for example, as a self-contained client terminal and/or server. In yet another implementation, server 218 is implemented as the storage server. Users use client terminals 208 to access the specific input sub-dataset identified as depicting the finding by analyzing the filtered 2D dataset from server 218. An indication of the identified specific input sub-dataset may be presented on the display of client terminals 208. Computing device 204 may provide enhanced features to the data server 218, by identifying the specific input sub-dataset from input dataset stored by the data server 218. For example, a PACS server 218 communicates with computing device 204 using an API, to transfer an identified 2D slice(s) of a 3D medical image (e.g., CT, 3D mammography) to computing device 204.

Computing device 204 receives the input dataset, which may be obtained from one or more sensor 212, for example, imaging sensors, medical imaging devices, electrodes, stress sensors, and the like.

Input datasets may be stored in an input dataset repository 214, for example, a storage server, a computing cloud, a virtual memory, and a hard disk. Input sub-datasets of the input dataset may be stored in input dataset repository 214, and/or in other locations such as data storage device 220 of computing device 204, and/or on another server 218. The input sub-dataset may be generated by dividing the input dataset, or may be obtained directed.

Computing device 204 may receive the input dataset and/or the input sub-datasets via one or more dataset interfaces 226, for example, a wire connection (e.g., physical port), a wireless connection (e.g., antenna), a network interface card, other physical interface implementations, and/or virtual interfaces (e.g., software interface, application programming interface (API), software development kit (SDK), virtual network connection).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIGS. 1 and/or 3.

Computing device 204 may include data storage device 220 for storing data, for example, an ensemble of ML models 220A), 2D outcome dataset 220B that stores the outcomes of the ML model ensemble, filtered 2D dataset 220C created by applying filter function 220D to 2D outcome dataset 220B, filter function 220D, CNN(s) 220E (e.g., filter-CNN, finding-CNN, kernel-CNN) related to filter function 220D, and/or training dataset 220F used to train CNN 220E. Data storage device 220 may be implemented as, for example, a memory, a local hard-drive, a removable storage unit, an optical disk, a storage device, a virtual memory and/or as a remote server 218 and/or computing cloud (e.g., accessed over network 210). It is noted that code of 220A-220F may be stored in data storage device 220, for example, with executing portions loaded into memory 206 for execution by processor(s) 202.

Computing device 204 may include data interface 222, optionally a network interface, for connecting to network 210, for example, one or more of, a network interface card, a wireless interface to connect to a wireless network, a physical interface for connecting to a cable for network connectivity, a virtual interface implemented in software, network communication software providing higher layers of network connectivity, and/or other implementations. It is noted that interfaces 222 and 226 may exist as two separate interfaces and/or combined into a single interface.

Computing device 204 may connect using network 210 (or another communication channel, such as through a direct link (e.g., cable, wireless) and/or indirect link (e.g., via an intermediary computing unit such as a server, and/or via a storage device) with one or more of:

Client terminal(s) 208, for example, users using client terminals 208 to access computing device 204 for viewing an indication of the specific input sub-dataset likely depicting the finding computed by computing device.

Server 218, for example, when server 218 is implemented as the data server (e.g., PACS server), where users use client terminals 208 to access the data server. Computing device 204 provides enhanced features to the data server, receiving the input dataset from the data server, and providing an indication of the specific input sub-dataset to the data server, where client terminals access the identified specific input sub-dataset from the data server.

Input dataset repository 214 may that store input dataset and/or multiple input sub-dataset, for example, obtained from sensor(s) 212. Repository 214 may store the specific input sub-dataset identified as depicting the image.

Computing device 204 and/or client terminal(s) 208 and/or server(s) 218 include and/or are in communication with one or more physical user interfaces 224 that include a display for presenting an indication of the specific input sub-dataset, and/or include a mechanism for entering data, for example, selecting parameters such as which filter function to use. Exemplary user interfaces 208 include, for example, one or more of, a touchscreen, a display, a keyboard, a mouse, and voice activated software using speakers and microphone.

Referring now back to FIG. 1, at 102, input sub-datasets of an input dataset are provided.

The input dataset may be divided into multiple input sub-datasets, for example, a 3D images is divided into parallel 2D images slices. The input dataset may exist as an aggregation of input sub-datasets, for example, for a 24 hour ECG recording, the input dataset may be an aggregation of multiple sequential input sub-datasets each of 10 minute duration.

The input dataset may be obtained from one or more sensors, for example, image sensors, ECG electrodes, and/or stress sensors.

In an example, the input dataset is a 3D medical images, for example, CT, MRI, breast tomography, digital breast tomosynthesis (DBT), 3D ultrasound, 3D nuclear imaging, and PET. The 2D medical images may be existing slices, and/or created by slicing the 3D medical image. In another example, the input dataset is a sequence of 2D medical images captured as a video by a 2D imaging device, for example, colonoscope, endoscope, bronchoscope, and 2D ultrasound. In yet another example, the input dataset is a 24 hour ECG recording capturing by one or more ECG electrodes. Each input sub-dataset may be a part of the recording over sequential time intervals, for example, 20 minutes. In yet another example, the input dataset is a 24 hour recording capturing by one or more stress sensors that analyze stress applied to a bridge. Each input sub-dataset may be a part of the recording over sequential time intervals, for example, 20 minutes.

At 104, the input sub-datasets (e.g., each one) are fed into each ML model of the ensemble. For example, for a set of 300 2D slices of a 3D image and 25 ML models in the ensemble, each of the 300 2D slices is fed into each of the 25 ML models, for a total of 25×300=7500 individual feedings.

Each ML model is trained to generate an outcome indicative of likelihood of a finding depicted in a respective input sub-dataset. The finding may be, for example, an indication of cancer in a medical image, an indication of an arrhythmia in an ECG, and an indication of high risk stress in a stress recording of a bridge.

The ensemble of ML models may differ, for example, in terms of architecture, in terms of meta-parameters, and/or in terms of the training dataset used to train the respective ML model.

The ensemble of ML models may be implemented as, for example, one or more classifiers, neural networks of various architectures (e.g., fully connected, deep, encoder-decoder), support vector machines (SVM), logistic regression, k-nearest neighbor, decision trees, boosting, random forest, and the like. Machine learning models may be trained using supervised approaches and/or unsupervised approaches.

At 106, outcomes are obtained from the ensemble of ML models. The outcomes may be a score indicative of likelihood of the finding being depicted in the respective input sub-dataset, for example, a probability value, or using another scale.

At 108, optionally, an order of arrangement of the ML models of the ensemble is computed. The arrangement defines the order for arranging the outcomes of the ML model along the generated 2D outcome dataset (e.g., as described in 110).

Inventors made the surprising discovery that arranging the outcomes of the ML model in the 2D outcome dataset increases accuracy of identifying the specific 2D input sub-dataset depicting the finding when the 2D outcome dataset is processed using the filter function, as described herein. The accuracy is increased over the embodiment of identifying the specific 2D input sub-dataset depicting the finding when the 2D outcome dataset without the arrangement of the ML models is processed using the filter function.

Optionally, ML models are arranged according to similarity in terms of architecture and/or meta-parameters, where ML models that are most similar to each other are closer along a first dimension of the 2D outcome dataset and ML models that are less similar to each other are more separated along the first dimension. An exemplary process is now described. ML models of the ensemble are clustered, where each cluster includes ML models of a same architecture, with different meta-parameters. Different clusters include ML models with different architectures. A statistical distance between the different architectures of the clusters is computed. Clusters of different architectures that have increasing statistical distance between the different architectures are arranged consecutively along the first dimension of the 2D outcome dataset, and within each cluster, ML models of the respective cluster that have increasing statistical distances between meta-parameters of the same architecture are arranged consecutively along the first dimension.

Alternatively or additionally, ML models are arranged in terms of performance, where ML models that are closer in similarity of performance are closer along the first dimension of the 2D outcome dataset and ML models that are further in similarity of performance are further away along the first dimension.

Similarity of performance may be measured, for example, using Cohen's Kappa. An exemplary arrangement for implementations using Cohen's Kappa is as follows: Derive a test set that the ML models weren't trained on, for example, a held-out test set, and/or a different, pseudo-held-out set which may avoid held-out contamination. Based on the results of the ML models on positive and negative cases in the pseudo-held-out set, compute Cohen's Kappa coefficients between every pair of ML models, representing pairwise ML model similarity. Use the pairwise model similarity values to derive a model distance matrix (distance may be defined as an inverse of similarity, or one minus similarity). Sort the model distance matrix, so that index-wise close ML models have small distances. When there are few ML models, all model permutations may be evaluated. The pairs where the sum of pairwise distances of adjacent models is smallest may be used. Another approach method is described, for example, at https://gmarti(dot)gitlab(dot)io/ml/2017/09/07/how-to-sort-distance-matrix(dot)html.

The resulting ML model order is used for the 2D outcome dataset.

At 110, a 2D outcome dataset storing the outcomes of the ensemble of ML models is generated. The outcomes of the ML models may be formatted into a 2D format, optionally based on a format defined for an image, and/or other 2D formats such as a 2D array. The first dimension of the 2D outcome dataset denotes the respective ML model, optionally according to the arrangement described with reference to 108. A second dimension denotes the respective input sub-dataset of the input dataset. For example, a value of 0.67 in cell (23, 232) indicates that ML model 23 of the ensemble generated an outcome value of 0.67 (e.g., probability) of 2D slice number 232 of the 3D image depicting the finding.

Optionally, the 2D outcome dataset is represented as a 2D image. Pixel intensity values of the 2D image denote the respective outcomes of the ensemble of ML models.

Representing the 2D outcome dataset as a 2D image enables using an image processing filter as the filter function. Moreover, representing the 2D outcome dataset as a 2D image enables efficient storage of the 2D outcome dataset by using existing image storage formats, for example, image storage formats based on compression of the image.

At 112, a filter function is applied to the 2D outcome dataset. A filtered 2D dataset may be computed by the application of the filter function to the 2D outcome dataset.

The filter function may be implemented as, for example, a 2D kernel filter (e.g., an image processing filter), a finding-CNN, a filter-CNN, and/or selected by a kernel-CNN.

For the case of the 2D kernel filter, the filtered 2D dataset may be generated using standard image processing approaches for filtering images using an image processing filter, for example, computing a convolution between the 2D kernel filter and the 2D outcome dataset. The 2D outcome dataset and the 2D kernel filter may be arranged as respective matrices, to enable efficient computation of the convolution. The 2D kernel filter may be of dimension 3×3, 5×5, 7×7, or greater. Examples of kernel filters include: a median filter, an edge detection filter, a sharpen filter, a box blur filter, a Gaussian blur filter, an unsharp masking filter. The type of filter may be selected together with an order arrangement for ordering the ML models along the first dimension of the 2D outcome dataset for obtaining a highest accuracy, for example, by performing experiments to determine the best combination of filter and order arrangement.

For the case of a finding-CNN, the 2D outcome dataset is fed into the finding-CNN. The finding-CNN is trained on a training dataset of sample 2D outcome datasets computed from outcomes of the ensemble of ML models in response to inputs of sample input sub-datasets of sample input datasets. Each sample 2D dataset is labelled with a label. The label may include, for example, a first ground truth class indicative of at least one sample input sub-dataset depicting the finding, and/or with a second ground truth class indicative of absence of the finding in the respective sample input 2D dataset.

For the case of the kernel-CNN, the 2D outcome dataset is fed into the kernel-CNN. The kernel-CNN generates an outcome of the 2D kernel filter, which is then used to create the filtered 2D dataset from the outcome 2D dataset, as described herein. The kernel-CNN may be trained to generate an outcome of a convolution kernel, on a training dataset of a sample 2D outcome datasets each labelled with a ground truth label indicative of a finding, for example, a first ground truth class indicative of at least one sample input sub-dataset depicting the finding or with a second ground truth class indicative of absence of the finding in the sample input 2D dataset. The kernel-CNN may be trained using a loss function described with reference to 308 of FIG. 3. The training is done using the loss function, where a maximal mean and/or average of a column of an input of a 2D outcome dataset, when filtered by the outcome of the convolutional kernel of the kernel-CNN, is closest to the ground truth label. The 2D kernel filter is obtained as the outcome convolutional kernel of the kernel-CNN.

For the case of the filter-CNN the 2D outcome dataset is fed into the filter-CNN. The filter-CNN acts as the filter function, and generates an outcome of the 2D filtered dataset. The filter-CNN may be trained on a training dataset of sample records, each including a respective sample 2D outcome dataset and a ground truth label of a respective sample filtered 2D dataset. The ground truth label may be selected, for example, by testing different filtered 2D datasets for each sample 2D outcome dataset to determine the highest filtered 2D dataset that provides the most accurate outcome for the respective sample 2D outcome dataset.

An exemplary approach for training the CNN(s) is described with reference to FIG. 3.

Optionally, the filter function includes a combination of the 2D kernel filter and one or more CNNs. For example, a filtered 2D dataset is computed by the convolution between the 2D kernel filter and the 2D outcome dataset, and/or outputted by the filter-CNN, and/or the 2D kernel filer is outputted by the kernel-CNN. The filtered 2D dataset is then inputted into the finding-CNN. In such implementation, the finding-CNN may be trained on a training dataset including sample filtered 2D datasets created by computing the convolution between the 2D kernel filter and each of the sample 2D datasets, and/or outputted by the filter-CNN, and/or the 2D kernel filer is outputted by the kernel-CNN.

At 114, the filtered 2D dataset is analyzed to identify one or more specific input sub-datasets of the input dataset likely depicting the finding. For example, which 2D slices of the 3D medical image depict cancer, and/or which time intervals of the 24 hour ECG depict an arrhythmia.

In the implementations in which the 2D outcome dataset is fed into the finding-CNN, the analysis of the filtered 2D dataset is performed by obtaining the specific sub-dataset(s) as an outcome of the CNN.

In the implementations in which the filtered 2D dataset is generated by applying the 2D kernel filter to the 2D outcome dataset, different analysis approaches may be used. For example:

A respective sum is computed for each respective 2D input sub-dataset. The sum is computed by adding the outcomes of the ensemble of ML models obtained in response to the input of the respective input sub-dataset. A specific sum denoting a maximal of the respective sums is identified. The specific input sub-dataset(s) corresponds to the specific sum.

A maximal value of the outcome of the ensemble of ML models is identified for each input sub-dataset. The specific input sub-dataset(s) is selected according to the maximal value of the input sub-datasets. The maximal value of the outcome of the specific input sub-dataset(s) denotes the likelihood of the finding depicted in the specific input sub-dataset(s).

Optionally, the filtered 2D dataset is processed prior to the analysis, such as to emphasize ML models that have low scores for negative outcomes (i.e., no finding) of input sub-models. For example, an average of the outcomes of the ensemble of ML models is computed for each input sub-dataset dimension of the filtered 2D dataset. The average is subtracted from the respective outcome for each input sub-dataset dimension of the filtered 2D dataset. In another example, a first ML model generates an outcome score of 0.3 to input sub-datasets with negative results (i.e., with no finding depicted therein) and a score of 1 to positive input sub-dataset (i.e., where a finding is identified therein). A second ML model generates an outcome of 0 the negative input sub-datasets and 0.8 to positive input sub-datasets. Since positives are rare, the average for the first ML model is about 0.3, and for the ML model second about 0. After subtracting the average, the maximum in the first ML model is 0.7, and in the second ML is 0.8.

At 116, action may be taken based on the specific input sub-dataset. For example, the specific input sub-dataset may be presented on a display, stored in a memory, forwarded to another device, and/or provided as input into another process.

Other exemplary actions include generating an alert indicative of the finding being identified in the specific sub-dataset, for example, a pop-up window, a flashing light, an email, a text message, and an automated phone call. An indication of the specific input sub-set may be provided, for example, the 2D slice, and/or the time interval of the input dataset. The indication may be, for example, presented as an image, played as an audio recording, and/or provided to a haptic device.

Optionally, a diagnosis of the subject is made based on finding of the specific input sub-dataset, for example, cancer. A treatment may be proposed based on the finding of the specific input sub-dataset. The patient may be treated based on the finding of the specific input sub-dataset, for example, using a treatment effective for cancer, such as chemotherapy, radiation therapy, surgery, immunotherapy, and biopsy.

Referring now back to FIG. 3, one or more CNNs, i.e., the filter-CNN, the kernel-CNN, and/or the finding-CNN, are trained.

At 302, sample 2D outcome datasets are generated. The sample 2D outcome datasets are generated from outcomes of the ensemble of ML models in response to inputs of sample sub-datasets of sample input datasets, for example, by implementing one or more of 102-110 described with reference to FIG. 1, using multiple sample input datasets. Example multiple sample input datasets include: multiple 3D medical images of multiple sample subjects, multiple 24 hour ECG readings from multiple sample subjects, and multiple stress measurements from multiple bridges.

At 304, each respective sample 2D outcome dataset is labelled with one or more ground truth labels.

Ground truth labels are according to the target CNN.

For the case of the finding-CNN and/or the kernel-CNN, exemplary labels include: a first ground truth class indicative of at least one sample sub-dataset depicting the finding (i.e., which sample sub-dataset of the sample input dataset depicts the finding), or a second ground truth class indicative of absence of the finding in the sample 2D outcome dataset (i.e., absence of the finding in the sample input dataset from which the sample 2D outcome dataset is created). Other labels indicative of presence and/or absence of the finding may be used.

For the case of the filter-CNN, exemplary ground truth labels are a respective sample filtered 2D dataset. The ground truth label may be selected, for example, by testing different filtered 2D datasets for each sample 2D outcome dataset to determine the highest filtered 2D dataset that provides the most accurate outcome for the respective sample 2D outcome dataset.

At 306, a respective training dataset is created for each respective CNN (i.e., finding-CNN, filter-CNN, kernel-CNN) from respective labelled sample 2D outcome datasets according to the ground truth label corresponding to the respective CNN.

At 308, a loss function may be selected and/or predefined. The loss function may maximize a distance between the first ground truth class indicative of presence of the finding and the second ground truth class indicative of absence of the finding. The loss function may maximize a distance between a maximal value computed for the input data, and a maximal value computed for the ground truth label. The maximal value is computed for a same location within the second dimension of the outcome dataset and/or the filtered 2D dataset. For the outcome dataset, the second dimension denotes the same respective input sub-dataset inputted into each of the members of the ML model ensemble. For the filtered 2D dataset, the second dimension corresponds to the same location as in the outcome dataset, after the filter function is applied. The maximal value may be identified by finding the location of the second dimension with maximal average or maximal value along the set of values corresponding to a respective location along the second dimension. For example, the input sub-dataset (e.g., CT slice) for which the most ML models of the ensemble outputted highest values, indicating the input sub-dataset most likely depicting the visual finding.

As used below, the term "column" refers to a location of the second dimension of the 2D outcome dataset and/or of the filtered 2D dataset, that correspond to a same input sub-dataset for which multiple ML models of the ensemble outputted values.

Exemplary loss functions include:
A difference between mean scores of the sample 2D outcome dataset columns of the first and second ground truth classes.
A ratio between the mean scores of the sample 2D outcome dataset columns of the first and second ground truth classes.
An average of a difference between average positive scores of the sample 2D outcome dataset columns of the first ground truth class and average negative scores of the sample 2D outcome dataset columns of the second ground truth class, per ML model of the ensemble of the ML models.
An average of a ratio between average positive scores of the sample 2D outcome dataset columns of the first ground truth class and average negative scores of the sample 2D outcome dataset columns of the second ground truth class, per ML model of the ensemble of the ML models.

At 310, each CNN is trained on a respective training dataset using the selected and/or defined loss function.

Optionally, the CNN is arranged in a dual head architecture. The sample 2D outcome datasets are fed into an input of the finding-CNN, and both of (i) the labels of the sample 2D outcome dataset columns and (ii) the column of the 2D outcome dataset corresponding to the labelled sample 2D input dataset column, serve as ground truth targets that influence the learning of the weights of the finding-CNN. A loss function of a first head minimizes a difference between mean scores of the sample 2D outcome dataset columns, and a second head produces a classification of the sample 2D outcome dataset. A loss function of the second head is based on an error of the classification.

Figure 4A:
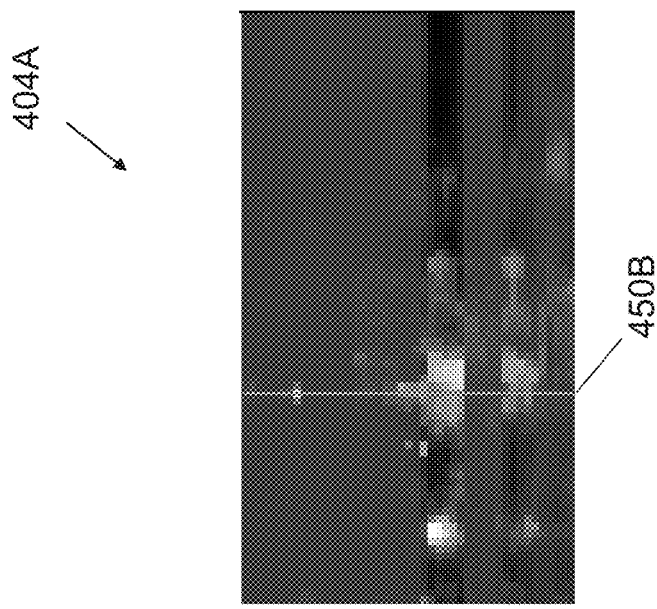
FIG. 4A-4C are examples of the 2D outcome dataset and the corresponding filtered 2D dataset presented as images, in accordance with some embodiments of the present invention.
Figure 4A:
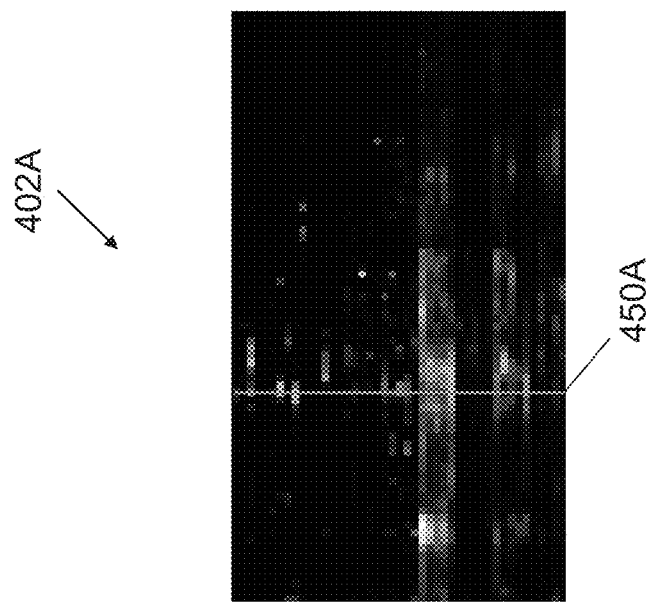
Figure 4B:
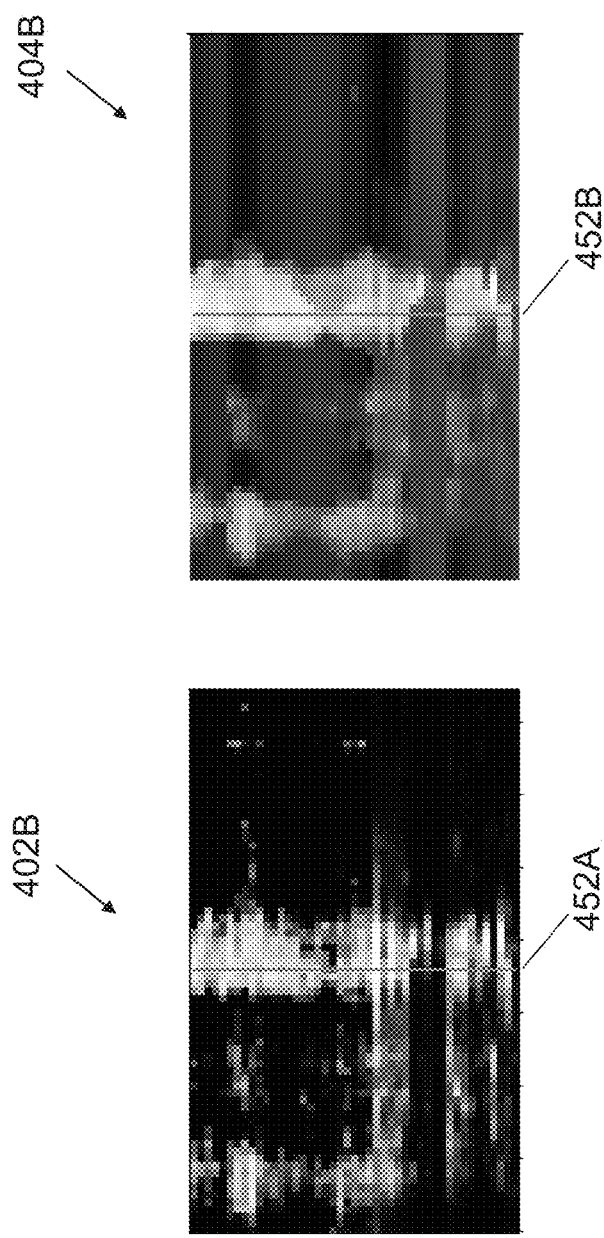
Figure 4C:
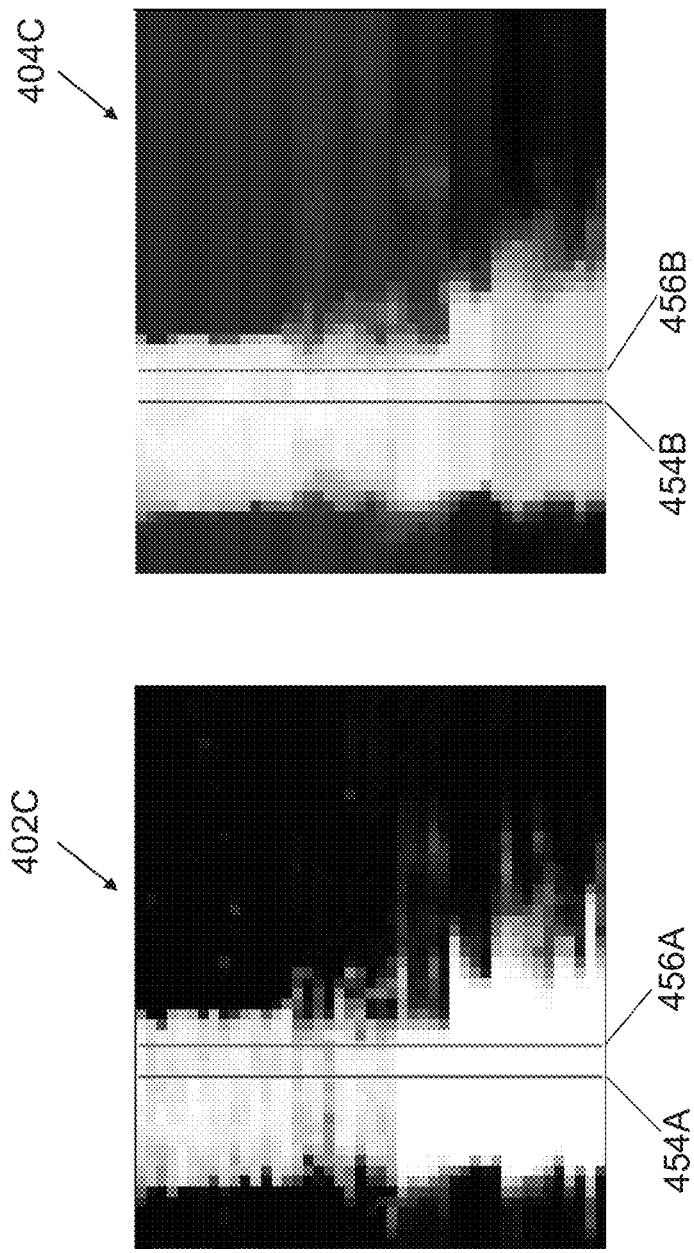

Reference is now made to FIG. 4A-4C, which depicts examples of the 2D outcome dataset and the corresponding filtered 2D dataset presented as images, in accordance with some embodiments of the present invention. 2D outcome datasets 402A, 402B, and 402C are presented as images generated from outcomes of ML models fed 2D slices (i.e., input sub-datasets) of a 3D image (i.e. input dataset). The 3D image is a 3D mammogram, and the finding is cancer. The x-axis depicts the sequential 2D slices. The y-axis depicts the respective ML model of the ensemble. The pixel values at (x,y) pixel coordinates are based on the outcome of the respective ML model for the respective 2D slice. Filtered 2D datasets 404A, 404B, and 404C are generated by applying a 2D kernel filter, a 3×3 median filter in the depicted example, to corresponding 2D outcome datasets 402A, 402B, and 402C, as described herein.

FIG. 4A depicts 2D outcome dataset 402A and filtered 2D dataset 404A for a 3D image for which presence of the finding is unknown. FIG. 4B depicts 2D outcome dataset 402B and filtered 2D dataset 404B for a 3D image for which presence of the finding is negative. FIG. 4C depicts 2D outcome dataset 402C and filtered 2D dataset 404C for a 3D image for which presence of the finding is positive.

Each pair of vertical lines 450A and 450B of FIG. 4A, 452A and 452B of FIG. 4B, 454A and 454B of FIG. 4C, and 456A and 456B of FIG. C, represent the same location within the second dimension of the respective outcome dataset and respective the filtered 2D dataset for the respective case. For the outcome dataset, the second dimension denotes the same respective input sub-dataset inputted into each of the members of the ML model ensemble. For the filtered 2D dataset, the second dimension corresponds to the same location as in the outcome dataset, after the filter function is applied. The vertical lines may be used by the loss function for training one or more of the CNNs described herein. For example, values alone each vertical lines are averaged, or the maximal value along each vertical line are computed. One vertical line per image may be selected according to highest average value along the line and/or according to maximal value along the line. The two lines are used by a loss function during training of one or more CNNs described herein, for maximizing the distance between the two lines.

Various embodiments and aspects of the present invention as delineated herein above and as claimed in the claims section below find experimental and/or calculated support in the following examples.

EXAMPLES

Reference is now made to the following examples, which together with the above descriptions illustrate some embodiments of the present invention in a non-limiting fashion.

Inventors performed a computational experiment by computing classification scores (i.e., outcomes) for several thousand Digital Breast Tomography volumes (i.e., input datasets), using 45 classifiers (i.e., the ML model ensemble). Scores for each slice (i.e., each input sub-dataset) were computed once using the filtered 2D dataset, and once using the 2D dataset (i.e., serving as control). A best slice was chosen per volume, and the score of the best slice was used as the volume score. The mean of the volume scores per slice was taken as the slice score, and the maximum of the slice scores per exam was taken as the exam score. The 45 exam scores were aggregated once by taking their mean (referred to as scoring 1), and once by an optimized voting algorithm (referred to as scoring 2). The result presented in the Table below are for 100 iterations, and are measured by sensitivity (i.e., the rate of cancer detection) and specificity (i.e. the rate of non-cancer detection). There were 3214 positive cases in this experiment.

|  | Sensitivity without the filtered 2D dataset | Sensitivity with the filtered 2D dataset | Specificity without the filtered 2D dataset | Specificity with the filtered 2D dataset |
| --- | --- | --- | --- | --- |
| Scoring 1 | 0.996 | 0.993 | 0.162 | 0.245 |
| Scoring 2 | 1.000 | 0.991 | 0.165 | 0.331 |

As summarized in the Table above, specificity is significantly increased when using the filtered 2D dataset, for both scoring approaches, in comparison to standard approaches without using the filtered 2D dataset. It is noted that sensitivity, which is statistically close to 1, is not significantly impacted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant kernel filters will be developed and the scope of the term kernel filter is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of identifying a finding in an input sub-dataset of an input dataset using an ensemble of machine learning (ML) models, comprising:
   obtaining outcomes of an ensemble of a plurality of ML models generated in response to feeding each of a plurality of input sub-datasets of the input dataset into each ML model of the ensemble of the plurality of ML models trained to generate an outcome indicative of likelihood of a finding depicted in a respective input sub-dataset;

creating a two dimensional (2D) outcome dataset storing outcomes of the ensemble of the plurality of ML models, wherein a first dimension denotes the respective ML model of the ensemble of ML models and a second dimension denotes the respective input sub-dataset of the plurality of input sub-datasets of the input dataset, wherein ML models of the ensemble of the plurality of ML models are clustered into a plurality of clusters, each cluster including ML models of a same architecture, wherein clusters of architecture that have increasing statistical distance between the different architectures are arranged consecutively along the first dimension of the 2D outcome dataset, and within each cluster, ML models of the respective cluster that have increasing statistical distances between meta-parameters of the same architecture are arranged consecutively;

computing a filtered 2D dataset by applying a filter function to the 2D outcome dataset; and analyzing the filtered 2D dataset to identify at least one specific input sub-dataset of the plurality of input sub-datasets of the input dataset likely depicting the finding.

2. The method of claim 1, wherein computing the filtered 2D dataset by applying the filter function and analyzing the filtered 2D dataset comprises:

inputting the 2D outcome dataset into a finding-convolutional neural network (CNN) trained on a training dataset of a plurality of sample 2D outcome datasets computed from outcomes of the ensemble of the plurality of ML models in response to inputs of a plurality of sample input sub-datasets of a plurality of sample input datasets, each of the plurality of sample 2D outcome datasets labelled with a first ground truth class indicative of at least one sample input sub-dataset depicting the finding or with a second ground truth class indicative of absence of the finding in the sample input 2D dataset; and obtaining as an outcome of the finding-CNN, the at least one specific sub-dataset of the plurality of input sub-datasets of the input dataset likely depicting the finding.

3. The method of claim 2, wherein the finding-CNN is trained using a loss function that maximizes a distance between the first ground truth class indicative of presence of the finding and the second ground truth class indicative of absence of the finding.

4. The method of claim 3, wherein the loss function is selected from a group consisting of: (i) a difference between mean scores of the sample 2D outcome dataset columns of the first and second ground truth classes, (ii) a ratio between the mean scores of the sample 2D outcome dataset columns of the first and second ground truth classes, (iii) an average of a difference between average positive scores of the sample 2D outcome dataset columns of the first ground truth class and average negative scores of the sample 2D outcome dataset columns of the second ground truth class, per ML model of the ensemble of the plurality of ML models, and (iv) an average of a ratio between average positive scores of the sample 2D outcome dataset columns of the first ground truth class and average negative scores of the sample 2D outcome dataset columns of the second ground truth class, per ML model of the ensemble of the plurality of ML models, wherein each respective column indicates a set of values outputted by the ML ensemble for a specific input sub-dataset.

5. The method of claim 2, wherein the finding-CNN is arranged in a dual head architecture, wherein the sample 2D outcome datasets are fed into an input of the finding-CNN, and both of (i) the labels of the sample 2D outcome dataset columns and (ii) the column of the 2D outcome dataset corresponding to the labelled sample 2D input dataset column, serve as ground truth targets that influence the learning of the weights of the finding-CNN, wherein a loss function of a first head minimizes a difference between mean scores of the sample 2D outcome dataset columns, and a second head produces a classification of the sample 2D outcome dataset, wherein a loss function of the second head is based on an error of the classification.

6. The method of claim 2, further comprising computing a filtered 2D dataset by computing a convolution between a 2D kernel filter and the 2D outcome dataset, wherein the filtered 2D dataset is inputted into the CNN, and wherein the training dataset includes a plurality of sample filtered 2D datasets created by computing the convolution between the 2D kernel filter and each of plurality of sample 2D outcome datasets.

7. The computer implemented method of claim 1, wherein computing the filtered 2D dataset comprises inputting the 2D outcome dataset into a filter-CNN, and obtaining the filtered 2D dataset as an outcome of the filter-CNN, wherein the filter-CNN is training on a training dataset of a plurality of sample records, each including a respective sample 2D outcome dataset and a ground truth label of a respective sample filtered 2D dataset.

8. The computer implemented method of claim 1, wherein the 2D outcome dataset is represented as a 2D image, wherein pixel intensity values of the 2D image denote respective outcomes of the ensemble of the plurality of ML models, wherein the filter function is an image processing filter.

9. The method of claim 1, wherein ML models of the ensemble of the plurality of ML models are further arranged consecutively along the first dimension of the 2D outcome dataset according to similarity in performance, wherein ML models that are closer in similarity of performance are closer along the first dimension and ML models that are further in similarity of performance are further away along the first dimension.

10. The method of claim 1, wherein computing a filtered 2D dataset by applying a filter function to the 2D outcome dataset comprises computing a filtered 2D dataset by computing a convolution between a 2D kernel filter and the 2D outcome dataset; and wherein analyzing comprises analyzing the filtered 2D dataset.

11. The computer implemented method of claim 10, wherein the 2D outcome dataset and the 2D kernel filter are arranged as respective matrices.

12. The computer implemented method of claim 10, further comprising:

feeding the 2D outcome dataset into a kernel-CNN trained on a training dataset of a plurality of sample 2D outcome datasets each labelled with a ground truth label indicative of a finding, for generating an outcome of a convolutional kernel, wherein the kernel-CNN is trained using a loss function where a maximal mean of a column of an input of a 2D outcome dataset that when filtered by the outcome of the convolutional kernel of the kernel-CNN, is closest to the ground truth label; and obtaining the 2D kernel filter as the outcome convolutional kernel of the kernel-CNN.

13. The computer implemented method of claim 10, wherein the kernel filter is selected from a group consisting of: a median filter, an edge detection filter, a sharpen filter, a box blur filter, a Gaussian blur filter, an unsharp masking filter.

14. The computer implemented method of claim 10, wherein analyzing the filtered 2D dataset is selected from a group consisting of: (i) computing a respective sum, for each respective 2D input sub-dataset, from the outcomes of the ensemble of the plurality of ML models in response to an input of the respective input sub-dataset, and selecting the at least one specific input sub-dataset according to a specific sum denoting a maximal of the respective sums (ii) identifying for each input sub-dataset, a maximal value of the outcome of the ensemble of the plurality of ML models, selecting the at least one specific input sub-dataset according to the maximal value of the plurality of input sub-datasets, wherein the maximal value of the outcome of the at least one specific input sub-dataset denotes the likelihood of the finding depicted in the at least one specific input sub-dataset.

15. The method of claim 10, further comprising, prior to analyzing the filtered 2D dataset:
computing for each input sub-dataset dimension of the filtered 2D dataset, an average of the outcomes of the ensemble of ML models; and
for each input sub-dataset dimension of the filtered 2D dataset, subtracting the average from the respective outcome.

16. The method of claim 1, wherein the input dataset comprises 3D medical images, and the plurality of sub-datasets comprise a plurality of 2D medical images created by dividing the 3D medical image and/or captured as a video.

17. The method of claim 16, wherein the 3D medical image is selected from the group consisting of: CT, MRI, breast tomography, digital breast tomosynthesis (DBT), 3D ultrasound, 3D nuclear imaging, and PET, or wherein the plurality of 2D medical images are captured as a video by a 2D imaging device selected from the group consisting of: colonoscope, endoscope, bronchoscope, and 2D ultrasound.

18. A device for identifying a finding in an input sub-dataset of an input dataset using an ensemble of machine learning (ML) models, comprising:
at least one processor executing a code for:
obtaining outcomes of an ensemble of a plurality of ML models generated in response feeding each of a plurality of input sub-datasets of the input dataset into each ML model of the ensemble of the plurality of ML models trained to generate an outcome indicative of likelihood of a finding depicted in a respective input sub-dataset;
creating a two dimensional (2D) outcome dataset storing outcomes of the ensemble of the plurality of ML models, wherein a first dimension denotes the respective ML model of the ensemble of ML models and a second dimension denotes the respective input sub-dataset of the plurality of input sub-datasets of the input dataset, wherein ML models of the ensemble of the plurality of ML models are clustered into a plurality of clusters, each cluster including ML models of a same architecture, wherein clusters of architecture that have increasing statistical distance between the different architectures are arranged consecutively along the first dimension of the 2D outcome dataset, and within each cluster, ML models of the respective cluster that have increasing statistical distances between meta-parameters of the same architecture are arranged consecutively;
computing a filtered 2D dataset by applying a filter function to the 2D outcome dataset; and
analyzing the filtered 2D dataset to identify at least one specific input sub-dataset of the plurality of input sub-datasets of the input dataset likely depicting the finding.

19. A computer program product for identifying a finding in an input sub-dataset of an input dataset using an ensemble of machine learning (ML) models, comprising a non-transitory medium storing a computer program which, when executed by at least one hardware processor, cause the at least one hardware processor to perform:
obtaining outcomes of an ensemble of a plurality of ML models generated in response feeding each of a plurality of input sub-datasets of the input dataset into each ML model of the ensemble of the plurality of ML models trained to generate an outcome indicative of likelihood of a finding depicted in a respective input sub-dataset;
creating a two dimensional (2D) outcome dataset storing outcomes of the ensemble of the plurality of ML models, wherein a first dimension denotes the respective ML model of the ensemble of ML models and a second dimension denotes the respective input sub-dataset of the plurality of input sub-datasets of the input dataset, wherein ML models of the ensemble of the plurality of ML models are clustered into a plurality of clusters, each cluster including ML models of a same architecture, wherein clusters of architecture that have increasing statistical distance between the different architectures are arranged consecutively along the first dimension of the 2D outcome dataset, and within each cluster, ML models of the respective cluster that have increasing statistical distances between meta-parameters of the same architecture are arranged consecutively;
computing a filtered 2D dataset by applying a filter function to the 2D outcome dataset; and
analyzing the filtered 2D dataset to identify at least one specific input sub-dataset of the plurality of input sub-datasets of the input dataset likely depicting the finding.

* * * * *